US012725922B2

(12) United States Patent
Singh

(10) Patent No.: US 12,725,922 B2
(45) Date of Patent: Sep. 1, 2026

(54) ULTRAFAST RECONFIGURABLE INTELLIGENT SURFACES UTILIZING PHASE-CHANGE MATERIALS

(71) Applicant: Dell Products L.P., Round Rock, TX (US)

(72) Inventor: Tejinder Singh, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 455 days.

(21) Appl. No.: 18/194,718

(22) Filed: Apr. 3, 2023

(65) Prior Publication Data

US 2024/0332794 A1 Oct. 3, 2024

(51) Int. Cl.
*H01Q 15/00* (2006.01)
*H01Q 3/46* (2006.01)
*H05B 1/02* (2006.01)

(52) U.S. Cl.
CPC ............... *H01Q 3/46* (2013.01); *H05B 1/023* (2013.01); *H05B 2203/005* (2013.01)

(58) Field of Classification Search
CPC ............ H01Q 3/46; H01Q 3/34; H01Q 3/247; H01Q 15/148; H01Q 15/0066; H01Q 9/0442
See application file for complete search history.

(56) References Cited

U.S. PATENT DOCUMENTS 8,900,930 B2 12/2014 Moon
9,923,267 B1 3/2018 Pala et al.
9,972,905 B2 5/2018 Schaffner et al.
11,133,588 B1 * 9/2021 Matos ...................... H01Q 3/46
12,126,094 B2 * 10/2024 Gharbieh ................ H01Q 3/44
2016/0071653 A1 3/2016 Lamorey
2016/0345209 A1 11/2016 Talukdar et al.
(Continued)

FOREIGN PATENT DOCUMENTS

EP 4 175 068 5/2023

OTHER PUBLICATIONS

Non-Final Office Action received for U.S. Appl. No. 18/194,685 dated Apr. 2, 2025, 14 pages.
(Continued)

*Primary Examiner* — Awat M Salih
(74) *Attorney, Agent, or Firm* — Amin, Turocy & Watson, LLP

(57) ABSTRACT

The technology described herein is directed towards phase-change material-based (e.g., chalcogenide) radio frequency components that can be used in unit cells of a reconfigurable intelligent surface. A tunable device for reconfigurable operation is described, in which the operational width of phase-change material in the conductive state is controlled to controllably vary the phase shift of each unit cell. The width can be selectively controlled by heating elements that change the operational width of the material's lower-resistance state relative to its higher resistance state, resulting in a phase change of a unit cell with respect to redirecting an electromagnetic wave. By arranging the heating elements below the material, and actuating each one to provide resistive or conductive states within the overall unit cell surface, an analog-like device is provided to provide more granular phase shift control of the cells of a reconfigurable intelligent surface.

20 Claims, 10 Drawing Sheets

(56) References Cited

U.S. PATENT DOCUMENTS

| | | | | |
|---|---|---|---|---|
| 2017/0263179 | A1* | 9/2017 | Aurongzeb ............ | G06F 1/183 |
| 2018/0053603 | A1 | 2/2018 | Al-Hazmi et al. | |
| 2018/0166220 | A1 | 6/2018 | Lazarus et al. | |
| 2020/0068044 | A1 | 2/2020 | Shimizu et al. | |
| 2022/0400462 | A1 | 12/2022 | Dai et al. | |
| 2023/0083308 | A1 | 3/2023 | Cohen et al. | |
| 2023/0093364 | A1 | 3/2023 | Kumari et al. | |
| 2023/0144085 | A1 | 5/2023 | Dutta et al. | |
| 2023/0210026 | A1 | 6/2023 | Philip et al. | |
| 2023/0216175 | A1 | 7/2023 | Masuda | |
| 2024/0032445 | A1* | 1/2024 | Solomko ............ | H10N 70/8828 |
| 2024/0063986 | A1 | 2/2024 | Hwang et al. | |
| 2024/0080074 | A1 | 3/2024 | Lee et al. | |
| 2024/0329253 | A1 | 10/2024 | Singh | |
| 2024/0331950 | A1 | 10/2024 | Singh | |
| 2024/0331951 | A1 | 10/2024 | Singh | |
| 2024/0389483 | A1 | 11/2024 | Ting et al. | |
| 2024/0413858 | A1 | 12/2024 | Mcmenamy et al. | |
| 2025/0048126 | A1 | 2/2025 | Echigo et al. | |

OTHER PUBLICATIONS

Ex Parte Quayle Action received for U.S. Appl. No. 18/194,711 dated Apr. 2, 2025, 9 pages.

Notice of Allowance received for U.S. Appl. No. 18/194,711 dated Jun. 17, 2025, 5 pages.

Wikström, et al., "6G—Connecting a cyber-physical world", Ericsson White Paper, Feb. 1, 2022.

Daisuke Kitayama, Yuto Hama, Kensuke Miyachi, Yoshihisa Kishiyama, "Research of Transparent RIS Technology toward 5G evolution & 6G," in NTT DOCOMO Technical Journal, vol. 23, No. 2, Oct. 1, 2021.

Ertugrul Basar, Marco Di Renzo, Julien De Rosny, Merouane Debbah, Mohamed-Slim Alouini, "Wireless Communications Through Reconfigurable Intelligent Surfaces," in IEEE Access, vol. 7, pp. 116753-116773, Jul. 19, 2019.

L. Subrt and P. Pechac, "Controlling Propagation Environments Using Intelligent Walls," in Proceedings of the 6th European Conference on Antennas and Propagation (EUCAP), Prague, Czech Republic, Mar. 26-30, 2012, pp. 1-5.

N. Kaina, M. Dupre, G. Lerosey, M. Fink, "Shaping complex microwave fields in reverberating media with binary tunable metasurfaces," in Scientific Reports, vol. 4, No. 1, Published: Oct. 21, 2014.

L. Dai, B. Wang, M. Wang, X. Yang, J. Tan, S. Bi, S. Xu, F. Yang, Z. Chen, M. Di Renzo, C.-B. Chae, and L. Hanzo, "Reconfigurable Intelligent Surface-Based Wireless Communications: Antenna Design, Prototyping, and Experimental Results," in IEEE Access, vol. 8, pp. 45913-45923, 2020.

C. Huang, C. Zhang, J. Yang, et al., "Reconfigurable metasurface for multifunctional control of electromagnetic waves," In Advanced Optical Materials, vol. 5, No. 22, Sep. 29, 2017.

T. Debogovic and J. Perruisseau-Carrier, "Low Loss MEMS-Reconfigurable 1-Bit Reflectarray Cell with Dual-Linear Polarization," in IEEE Transactions on Antennas and Propagation, vol. 62, No. 10, 2014.

J. M. Zendejas, J. P. Gianvittorio, Y. Rahmat-Samii, and J. W. Judy, "Magnetic MEMS Reconfigurable Frequency-Selective Surfaces," in Journal of Microelectromechanical Systems, vol. 15, No. 3, pp. 613-623, 2006.

International Search Report and Written Opinion for PCT Application No. PCT/US2024/013896 mailed Sep. 5, 2024, 18 pages.

Rodrigues Davi V Q et al: "Optimized phase shifts in intelligent reflective surfaces for robust radar-based indoor coverage enhancement" Radar Sensor Technology XXVII, Proc. of SPIE, vol. 12535, Jun. 14, 2023, 13 pages.

Molero Carlos et al: "Metamaterial-Based Reconfigurable Intelligent Surface: 3D Meta-Atoms Controlled by Graphene Structures" IEEE Communications Magazine, IEEE Service Center, Piscataway, US, vol. 59, No. 6, Jul. 5, 2021 {Jul. 5, 2021) , pp. 42-48.

Singh et al. "Reconfigurable Intelligent Surfaces Using Latching Rotational Patterns of Chalcogenide Elements" U.S. Appl. No. 18/512,304, filed Nov. 17, 2023, 33 pages.

Singh et al. "Energy Efficient Ultra-Wideband Latching Tunable Metasurfaces" U.S. Appl. No. 18/616,802, filed Mar. 26, 2024, 34 pages.

Nokia Bell Labs, "Communications in the 6G Era", Url-https://www.bell-labs.com/institute/whitepapers/communications-6g-era-white-paper/##gref (download link: https://onestore.nokia.com/asset/207766), Sep. 9, 2020, 19 pages.

Rajatheva et al., "White Paper on Broadband Connectivity in 6G", Apr. 30, 2020, 46 pages.

Strinati et al., "Wireless Environment as a Service Enabled by Reconfigurable Intelligent Surfaces: The RISE-6G Perspective", Apr. 13, 2021, 6 pages.

Singh et al., "Chalcogenide Phase-Change Material Germanium Telluride for Radio-Frequency Applications", IEEE Nanotechnology Magazine, Jun. 2022, 20 pages.

Singh et al., "Experimental Investigation of Performance, Reliability, and Cycle Endurance of Nonvolatile DC-67 Ghz Phase-Change RF Switches", IEEE Transactions on Microwave Theory and Techniques, vol. 69, No. 11, Nov. 2021, 14 pages.

Renzo et al., "Smart Radio Environments Empowered by Reconfigurable Intelligent Surfaces: How It Works, State of Research, and The Road Ahead", IEEE, Apr. 20, 2020, 74 pages.

Poulakis Marios, "Metamaterials Could Solve One of 6g's Big Problems", IEEE Spectrum, Sep. 3, 2022, 24 pages.

NTT Docomo, "White paper: 5G Evolution and 6G", NTT Docomo Inc., Jan. 2022, 60 pages.

Jacobsen Jake, "Application in Illumination Design: Analyzing LiDAR Return Signal Strengths for Target Optical Surfaces and Atmospheric Conditions", White Paper, Synopsys, May 2020, 7 pages.

Yang et al., "A Programmable Metasurface with Dynamic Polarization, Scattering and Focusing Control", Scientific Reports, vol. 6, No. 35692, Oct. 24, 2016, 1-11pages.

MACOM "GaAs Beamlead PIN Diode", Url-https://cdn.macom.com/datasheets/MA4GP905.pdf, Retrieved from the Internet: Mar. 2, 2023, 4 pages.

Singh et al., "Miniaturized 6-Bit Phase-Change Capacitor Bank with Improved Self-Resonance Frequency and Q", Proceedings of the 52nd European Microwave Conference, Sep. 27-29, 2022, 4 pages.

Singh et al., "Chalcogenide GeTe-Based Non-Volatile Switched K-Band Tunable Reflective Load for Reconfigurable RF Circuits", IEEE/MTT-S International Microwave Symposium, 2022, 4 pages.

Singh et al., "Reconfigurable and Scalable Monolithic Band Reject Circuit Utilizing Phase-Change Switch Matrices", Proceedings of the 16th European Microwave Integrated Circuits Conference, Apr. 3-4, 2022, 4 pages.

Singh et al., "Scalable Non-Volatile Chalcogenide Phase Change GeTe-Based Monolithically Integrated mmWave Crossbar Switch Matrix", IEEE/MTT-S International Microwave Symposium, 2021, 4 pages.

Singh, et al., "Reconfigurable PCM GeTe-Based Latching 6-Bit Digital Switched Capacitor Bank", Proceedings of the 15th European Microwave Integrated Circuits Conference, Jan. 11-12, 2021, 4 pages.

Singh et al., "Miniaturized Reconfigurable 28 GHz PCM-Based 4-bit Latching Variable Attenuator for 5G mmWave Applications", IEEE/MTT-S International Microwave Symposium, 2020, 4 pages.

Singh et al., "A Miniaturized Monolithic PCM Based Scalable Four-Port RF Switch Unit-Cell", Proceedings of the 49th European Microwave Conference, Oct. 1-3, 2019, 4 pages.

Singh et al., "Monolithic PCM Based Miniaturized T-type RF Switch for Millimeter Wave Redundancy Switch Matrix Applications", IEEE/MTT-S International Microwave Symposium, 2019, 3 pages.

Singh, et al., "Characterization of Phase Change Material Germanium Telluride for RF Switches", Proceedings of the 48th European Microwave Conference, Sep. 25-27, 2018, 4 pages.

Singh, et al., "Chalcogenide Phase Change Material GeTe Based Inline RF SPST Series and Shunt Switches", IEEE MTT-S Inter-

(56) References Cited

OTHER PUBLICATIONS national Microwave Workshop Series on Advanced Materials and Processes for RF and THz Applications, Jul. 16-18, 2018, 3 pages.
Singh et al., "Compact 26-30 GHz Reflection-Type Phase Shifter With 8-Bit Switched Phase Tuning Utilizing Chalcogenide Phase-Change Switches", IEEE Transactions on Microwave Theory and Techniques, vol. 71, No. 1, Jan. 2023, 10 pages.
Singh et al., "Ultra-Compact Phase-Change GeTe-Based Scalable mmWave Latching Crossbar Switch Matrices", IEEE Transactions on Microwave Theory and Techniques, vol. 70, No. 1, Jan. 2022, 12 pages.
Singh et al., "Experimental Investigation of Thermal Actuation Crosstalk in Phase-Change RF Switches Using Transient Thermoreflectance Imaging", IEEE Transactions On Electron Devices vol. 68, No. 7, Jul. 7, 2021.
Singh et al., "Non-Volatile Multiport DC-30 GHz Monolithically Integrated Phase-Change Transfer Switches", IEEE Electron Device Letters, vol. 42, No. 6, Jun. 2021, 4 pages.
Singh et al., "Scalable mmWave Non-Volatile Phase Change GeTe-Based Compact Monolithically Integrated Wideband Digital Switched Attenuator", IEEE Transactions on Electron Devices, vol. 68, No. 5, May 1, 2021, 7 pages.
Singh et al., "Investigation Into Self Actuation Limitation and Current Carrying Capacity of Chalcogenide Phase Change GeTe-Based RF Switches", IEEE Transactions on Electron Devices, vol. 67, No. 12, Dec. 1, 2020, 6 pages.
Singh et al., "Loss Compensated PCM GeTe-Based Latching Wideband 3-bit Switched True-Time-Delay Phase Shifters for mmWave Phased Arrays", IEEE Transactions on Microwave Theory and Techniques, vol. 38, No. 9, Sep. 2020, 11 pages.
Singh et al., "Miniaturized DC-60 GHz RF PCM GeTe-Based Monolithically Integrated Redundancy Switch Matrix Using T-Type Switching Unit Cells", IEEE Transactions on Microwave Theory and Techniques, vol. 37, No. 12, Dec. 2019, 10 pages.
Singh et al., "Characterization, Optimization, and Fabrication of Phase Change Material Germanium Telluride Based Miniaturized DC-67 GHz RF Switches", IEEE Transactions on Microwave Theory and Techniques, vol. 67, No. 8, Aug. 2019, 14 pages.
Y. Zhang, J. Cappos, T.S. Rappaport et al., "Future Internet bandwidth trends: An investigation on current and future disruptive technologies", Secure Systems Lab, Dept. Comput. Sci. Eng., Polytech. Inst. New York Univ., New York, NY, USA, Tech. Rep. TR-CSE-2013-0411/01/2013.
M. Poulakis, "Metamaterials Could Solve One of 6G's Big Problems [Industry View]," in Proceedings of the IEEE, vol. 110, No. 9, pp. 1151-1158, Sep. 2022.
L. Subrt and P. Pechac, "Controlling Propagation Environments Using Intelligent Walls," in 6th European Conference on Antennas and Propagation (EUCAP), 2012.
N. Kaina, M. Dupre, G. Lerosey, and M. Fink, "Shaping complex microwave fields in reverberating media with binary tunable metasurfaces," Scientific Reports, vol. 4, pp. 1-7, Aug. 2017.
L. Dai, B. Wang, M. Wang et al., "Reconfigurable Intelligent Surface-Based Wireless Communications: Antenna Design, Prototyping, and Experimental Results," in IEEE Access, vol. 8, pp. 45913-45923, 2020.
Singh et al. "Predictive Model for Reconfiguration of Phase Change Material-Based Reconfigurable Intelligent Surface" U.S. Appl. No. 19/023,264, filed Jan. 15, 2025, 42 pages.
Notice of Allowance received for U.S. Appl. No. 18/194,685 dated Aug. 4, 2025, 9 pages.
Non-Final Office Action received for U.S. Appl. No. 18/194,693 dated Feb. 9, 2026, 20 pages.
Non-Final Office Action received for U.S. Appl. No. 18/616,802 dated Apr. 21, 2026, 23 pages.
Office Action for U.S. Appl. No. 18/512,304 dated May 14, 2026, 71 pages.

* cited by examiner

ULTRAFAST RECONFIGURABLE INTELLIGENT SURFACES UTILIZING PHASE-CHANGE MATERIALS

BACKGROUND

Reconfigurable intelligent surfaces are specifically designed manmade surfaces of electromagnetic material, referred to as metamaterial, that are electronically controlled with integrated electronics. Metamaterials are artificially engineered materials fabricated using a stack of metal and dielectric layers. These thin two-dimensional metasurfaces can tune an electromagnetic wave's key properties, such as amplitude, phase, and polarization, as the electromagnetic wave is reflected or refracted by the surface. In other words, a reconfigurable intelligent surface is a two-dimensional surface whose surface can be electronically altered such that it changes the characteristics of any incoming electromagnetic wave, including the wave's phase.

Each metasurface typically is made up of (possibly up to) hundreds or thousands of unit-cells, and because the individual unit-cell can be controlled, reconfigurable intelligent surfaces can provide programmable and smart wireless environments. For example, one scenario is to use such a surface to intelligently reconfigure wireless communications. More particularly, objects in the path of a wireless signal, such as buildings and trees, can block wireless communication signals at higher frequencies, including millimeter-wave frequency bands (24.5 gigahertz, or GHz-52.6 GHZ), and even higher frequencies such as the U-Band (40-60 GHz) and the V-Band (60-75 GHZ), which are expected to move upwards to sub-terahertz bands. This can be overcome by installing a large number of base stations to provide coverage to otherwise blocked areas, but doing so would increase the infrastructure costs many times. Instead, a relatively inexpensive metasurface can be installed at various locations to reflect and/or refract higher frequency signals to otherwise blocked or weak coverage areas.

Various ways to control reconfigurable intelligent surfaces have been implemented, including those based on switching technologies such as field-effect transistors (FETs) and PIN diodes (formed from a p-type semiconductor, an undoped intrinsic region and an n-type semiconductor). With such switches used in each unit cell, the wireless operating frequency is a major factor because each of these existing switch technologies has different maximum operating frequencies and other frequency-dependent characteristics. For wireless communications beyond fifth generation (5G), such as 6G's sub-terahertz bands and even future terahertz bands, switch technologies like PIN diodes and FETs are not suitable. Further, with these technologies, switch size factors, ON-state series resistance, and overall power consumption (e.g., PIN diodes require continuous power when in an ON state, and there can be hundreds or thousands of unit cells) are also significant drawbacks.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
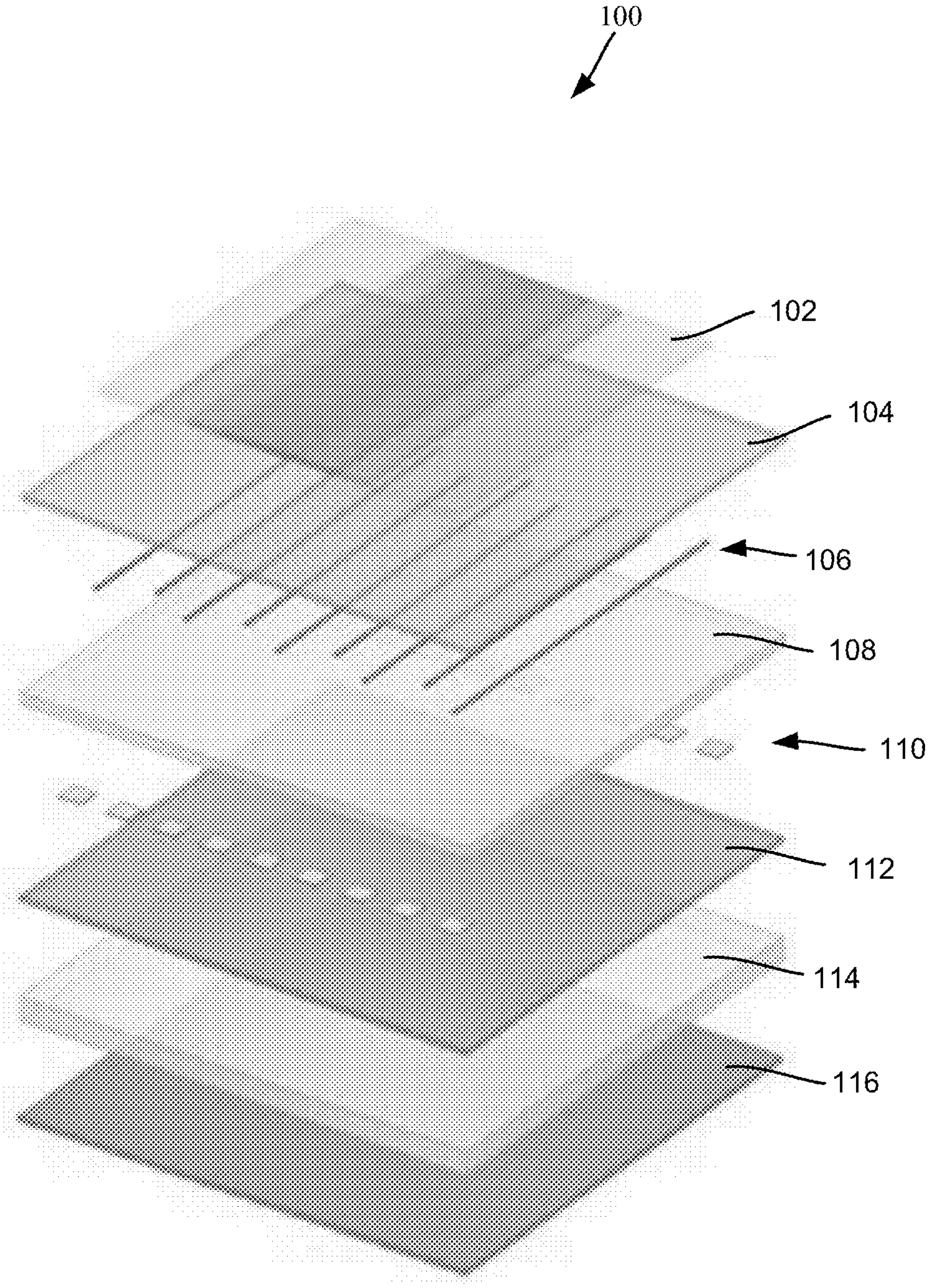
FIG. 1 is an exploded view representation of an example multi-layer structure of a model of a unit-cell where reconfigurability is achieved by using a chalcogenide material layer, in accordance with various aspects and implementations of the subject disclosure.

Various aspects of the technology described herein are generally directed towards a phase change material-based device that can be used in a unit cell of a reconfigurable intelligent surface. In general and as will be understood, the phase change material can be configured to have different widths of conductive portions relative to non-conductive portions. The relative widths determine the phase shift of a unit cell that includes the device.

As a result, control of the reconfigurable intelligent surface with respect to redirecting an impinging an electromagnetic wave is achieved by varying the relative widths in relevant unit cells, and therefore controlling the phase shift of each unit cell. A controller or the like controls the conductive or resistive states over different areas of the phase change material to achieve desired redirection.

It should be understood that any of the examples herein are non-limiting. As one example, a unit cell of a reconfigurable intelligent surface is described that is based on switching elements made of chalcogenide materials, e.g., alloys based on germanium-antimony-tellurium (GeSbTe); however this is only one non-limiting example, and other materials, including those not yet developed, can be leveraged by the technology described herein. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. Repetitive description of like elements employed in respective embodiments may be omitted for sake of brevity.

The following detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there are no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example multi-layer structure 100 of a model of a unit-cell, including a topmost, uniform layer 102 of a phase change material (e.g., GST alloy, made from reconfigurable chalcogenide). Moving downward in the representation of FIG. 1, the next lower (second) layer is a thermally conductive layer 104. A heater network 106 (e.g., refractory heater) is formed on third layer, which in this example includes separate heating elements, followed by a layer of thermally insulator material 108. The thermally conductive layer 104 on the top of heater network 106 allows the needed heat to conduct to the GST alloy, while the thermally insulator material 108 below the heater network prevents the heat flow downwards.

The control/bias network 110 for the heaters is designed on fifth layer, followed by a dielectric layer 112, which is coated on a high permittivity substrate 114. The bottom of the substrate is coated by another thin metallization layer 116. The heating elements can be individually controlled as described herein.

Chalcogenide material is formed with alloys containing group VI elements such as sulfur (S), selenium (Se) and telluride (Te). Among these, the alloys formed from different ratio combinations of germanium, antimony, and telluride (Ge—Sb—Te, or GST alloys) are currently the most popular for radio frequency and optical memory applications. In general, single-phase alloys are made of germanium telluride (GeTe) and antimony telluride (Sb2Te3). Alloys include Ge1Sb2Te4, Ge2Sb2Te5, and Ge1Sb4Te7. Depending on the alloy used, the properties range from high stability and low speed to low stability and high speed. The GST alloys have a unique property of reversibly switching between amorphous and crystalline states upon specific heat treatment by means of electrical pulses, hence the name "phase-change." The state in which atoms are arranged in a disorderly manner (short range order) is called the amorphous state, whereas the state where atoms are organized in an orderly manner (long range order) is called crystalline state. The disordered amorphous state has a lower mean free path of conduction for electrons that impedes current flow due to electron scattering, thus resulting in a higher resistance when compared to the crystalline state.

Figure 2:
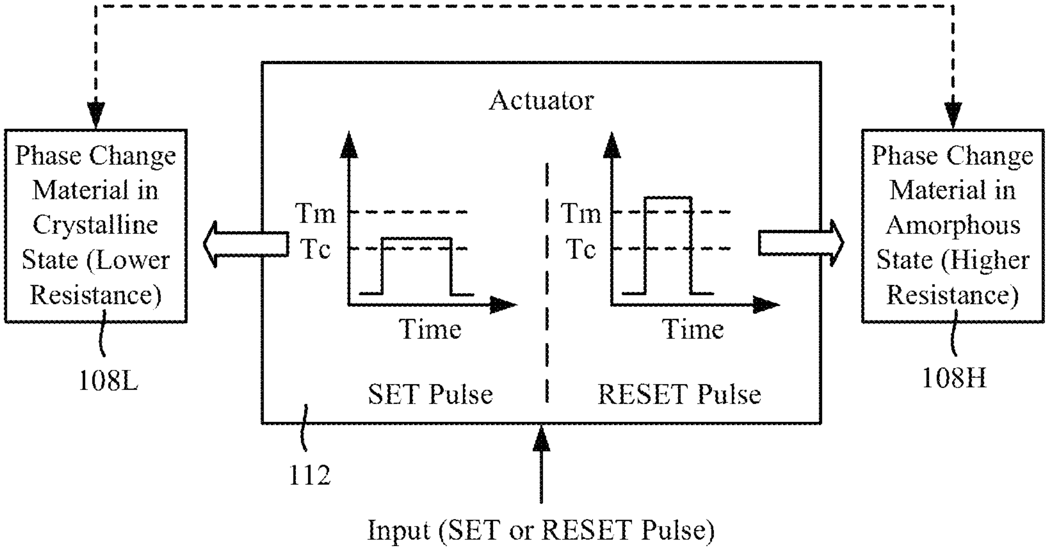
FIG. 2 shows an example of reversible switching of phase change material between an amorphous (high resistance) and crystalline (low resistance) states using a first electrical pulse for one state change and a second electrical pulse for a state change reversal, in accordance with various aspects and implementations of the subject disclosure.

The operation principle of the example unit cell structure 100 of FIG. 1 is based on the many orders of magnitude resistance change that chalcogenide phase change GST alloys undergo when provided a specific heat treatment using a pulse, as described with reference to FIG. 2. Such materials can reversibly transition between a low resistance (metallic/conductive) state to a high resistance (insulator/resistive) state. This transition occurs due to the change in crystal structure of the alloy, which changes from amorphous to crystalline. In order to control the states of the material, the heater network 106 has a matrix of heaters (heating elements) placed below the phase change material (chalcogenide material) layer 102. The narrow-width heating elements can be individually actuated by an electronic pulse. In the absence of any actuation, the material is in its amorphous (high resistance) state and acts as an insulator. A limited area (portion) of the chalcogenide material 102 is actuated by each heating element, and as more and more heaters are actuated, a larger and larger area of the material transitions to the low resistance metal state. Hence, a dynamic change in the shape of the reflection surface, which can correspond to its capacitance (area of the topmost conductor) can be achieved at a high speed, which provides the ultrafast reconfigurable operation.

Turning to tuning the unit cells' individual phases, in one example implementation the respective unit cells can be based on the effective operational width of the respective chalcogenide elements such as described in the examples herein. As shown in FIG. 2, a medium amplitude (typically 4-2 V) and relatively longer duration (typically on the order of 400 nanoseconds) SET electrical pulse (e.g., represented in the left portion of the actuator) is used for crystallization during a transition to the ON state. Energy from the SET pulse heats the material for sufficient time to crystallize the material and provides adequate time for atoms to reorganize to an orderly arrangement, thus transforming from an amorphous state to crystalline state. To change to the amorphous state, a short duration (typically less than 400 nanoseconds) and high amplitude (typically >2 V) RESET electrical pulse is used. The RESET pulse provides sufficient energy to melt the material to disorder the atoms followed by rapid quenching to freeze the atoms, thus transforming the material from the crystalline state to the amorphous state. Significantly, only a short duration pulse to a heating element is needed to switch the state of the material 102 (FIG. 1) between states at the area/portion above the corresponding heating element; significantly, the pulse transforms the material and latches the material into the state, without the need for continuous power in either state. The pulse duration and amplitude can be further optimized by tuning the ratio of GeSbTe alloy ratios.

Figure 3A:
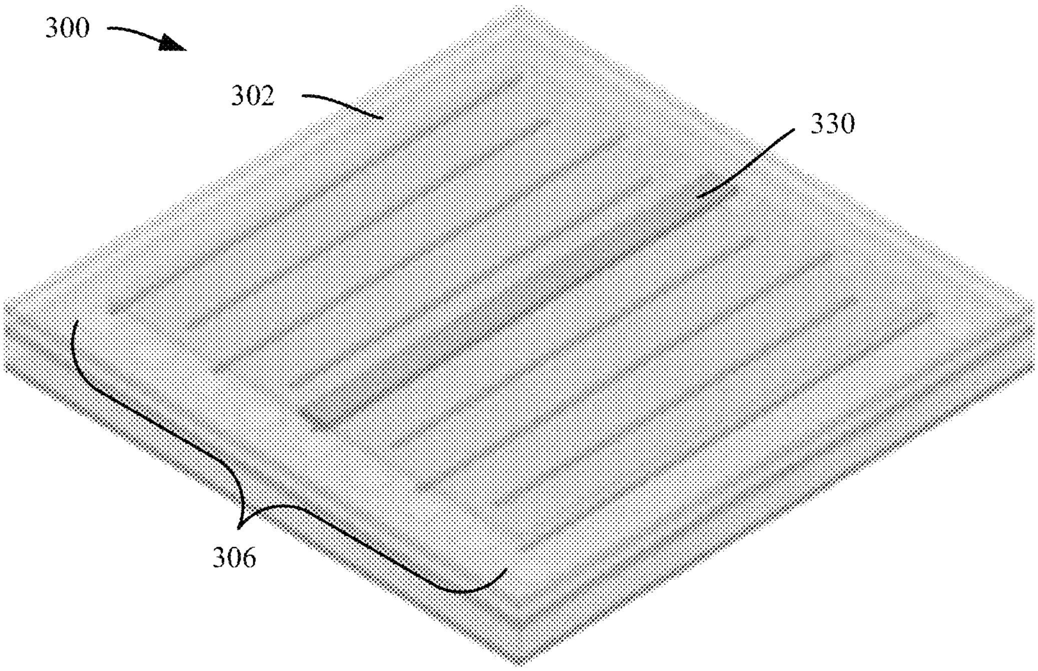
FIG. 3A shows an example of a unit cell surface for use in a reconfigurable intelligent surface with a controlled width that determines phase shift of the unit cell for redirecting an electromagnetic wave, in accordance with various aspects and implementations of the subject disclosure.
Figure 3B:
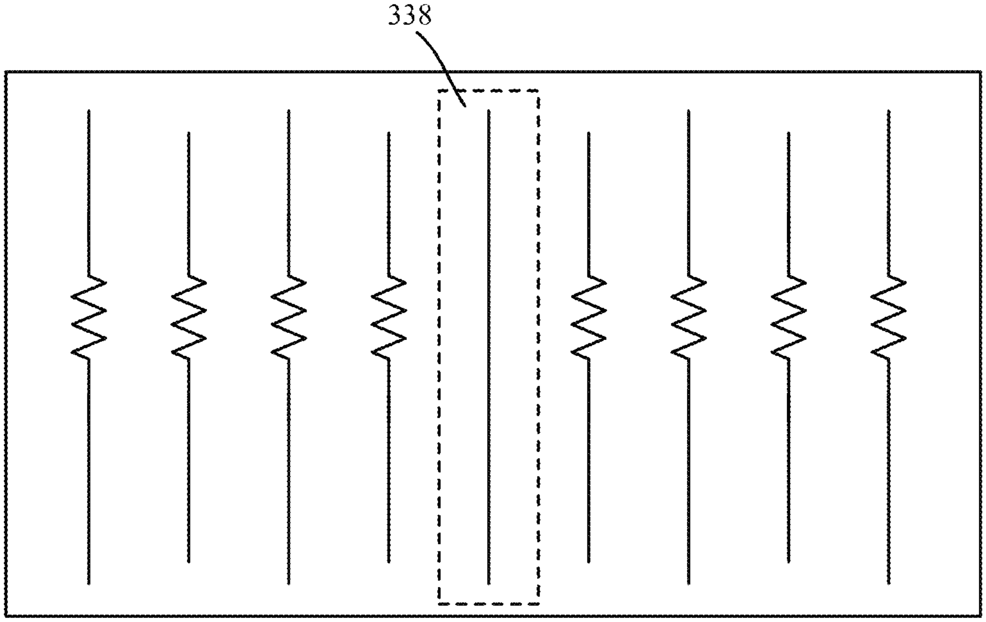
FIG. 3B shows an example representation of the lower resistance and higher resistance portions of the unit cell surface of FIG. 3A, in accordance with various aspects and implementations of the subject disclosure.

FIG. 3A shows a device 300 configured to have a relatively narrow width of conductive material 330 obtained by pulsing (as needed) the corresponding heating element(s) below the chalcogenide material 302 to create the appropriate higher or lower resistance states. FIG. 3B conceptually shows the example resistive and conductive states corresponding to FIG. 3A after actuation of the heater elements to obtain these states. The dashed box 338 generally represents the conductive area.

Figure 4A:
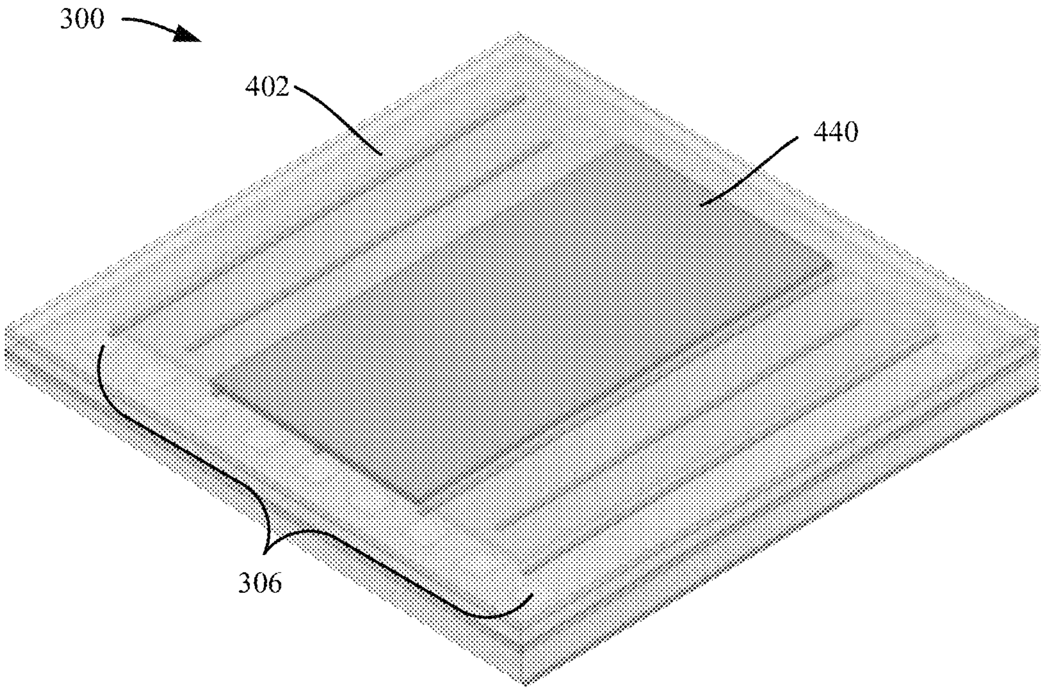
FIG. 4A shows an example of a unit cell surface for use in a reconfigurable intelligent surface with a controlled width, expanded relative to FIG. 3A, that determines phase shift of the unit cell for redirecting an electromagnetic wave, in accordance with various aspects and implementations of the subject disclosure.
Figure 4B:
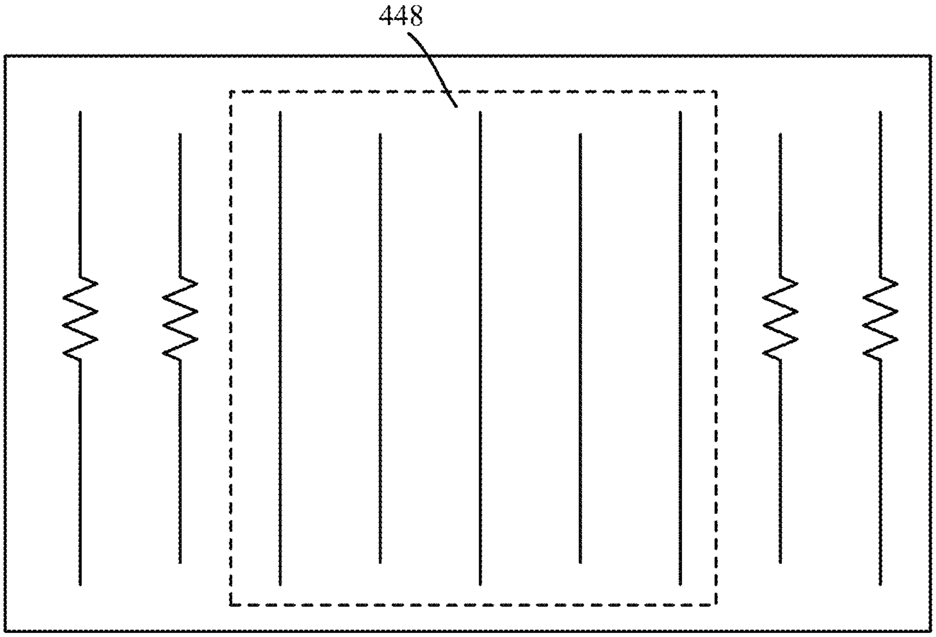
FIG. 4B shows an example representation of the lower resistance and higher resistance portions of the unit cell surface of FIG. 4A, in accordance with various aspects and implementations of the subject disclosure.

FIG. 4A shows a wider operational width 440 (relative to FIG. 3A) of the device 300 obtained by controlling the heater network 306 to enlarge the conductive portion of the chalcogenide material 302 to create the appropriate higher or lower resistance states. In this example, the conductive portions are a contiguous group, while the two resistive portions are discontiguous subgroups of the resistive areas. FIG. 4B conceptually shows the example resistive and conductive states corresponding to FIG. 4A after actuation of the heater elements to obtain these states. The dashed box 448 generally represents the conductive area.

Figure 5A:
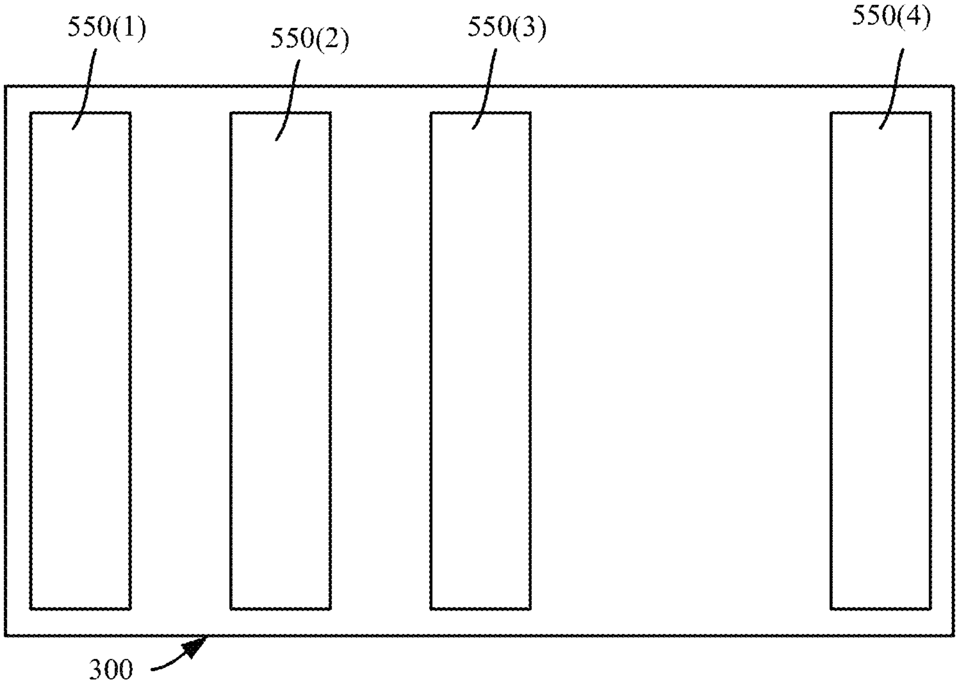
FIG. 5A shows an example of a unit cell surface for use in a reconfigurable intelligent surface with a controlled width that determines phase shift of the unit cell for redirecting an electromagnetic wave, in accordance with various aspects and implementations of the subject disclosure.
Figure 5B:
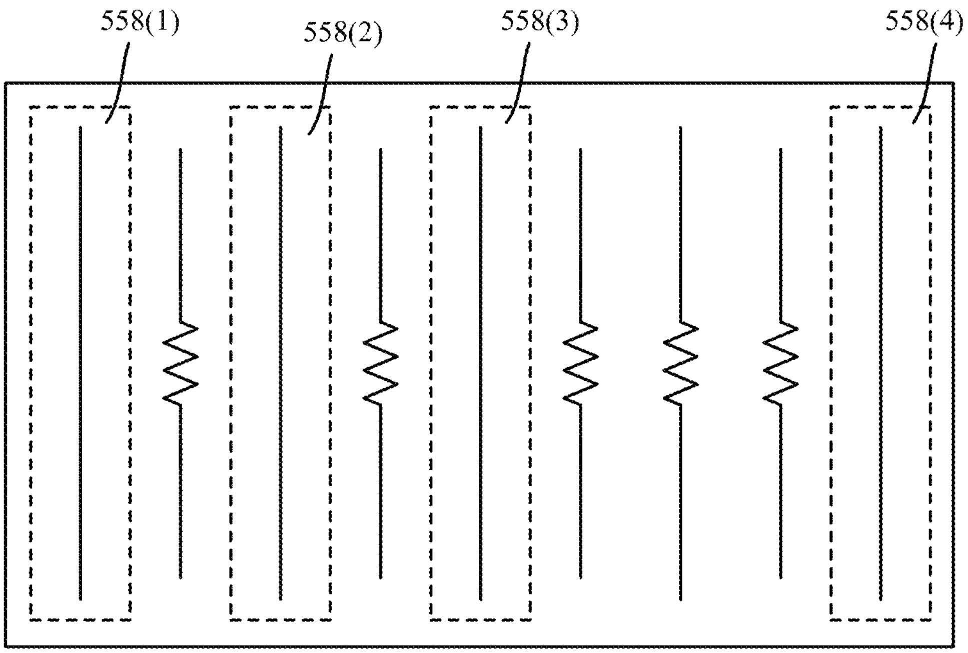
FIG. 5B shows an example representation of the lower resistance and higher resistance portions of the unit cell surface of FIG. 5A, in accordance with various aspects and implementations of the subject disclosure.

FIG. 5A shows an overall operational width obtained by discontiguous conductive portions 550(1)-550(4). In this example, the discontiguous conductive portions 550(1)-550(4) are in contrast to the contiguous portions shown in FIG. 4A. FIG. 5B conceptually shows the example resistive and conductive states corresponding to FIG. 5A after actuation of the heater elements to obtain these states. The dashed boxes 558(1)-558(4) generally represent the disjoint conductive areas.

It should be noted that the heating elements of the heater network 106 can be, but need not be, symmetrical or substantially symmetrical with respect to their separation distances. Further, the heating elements can be, but need not be, the same widths or substantially the same widths, nor need they necessarily be parallel or substantially parallel to one another.

Figure 6:
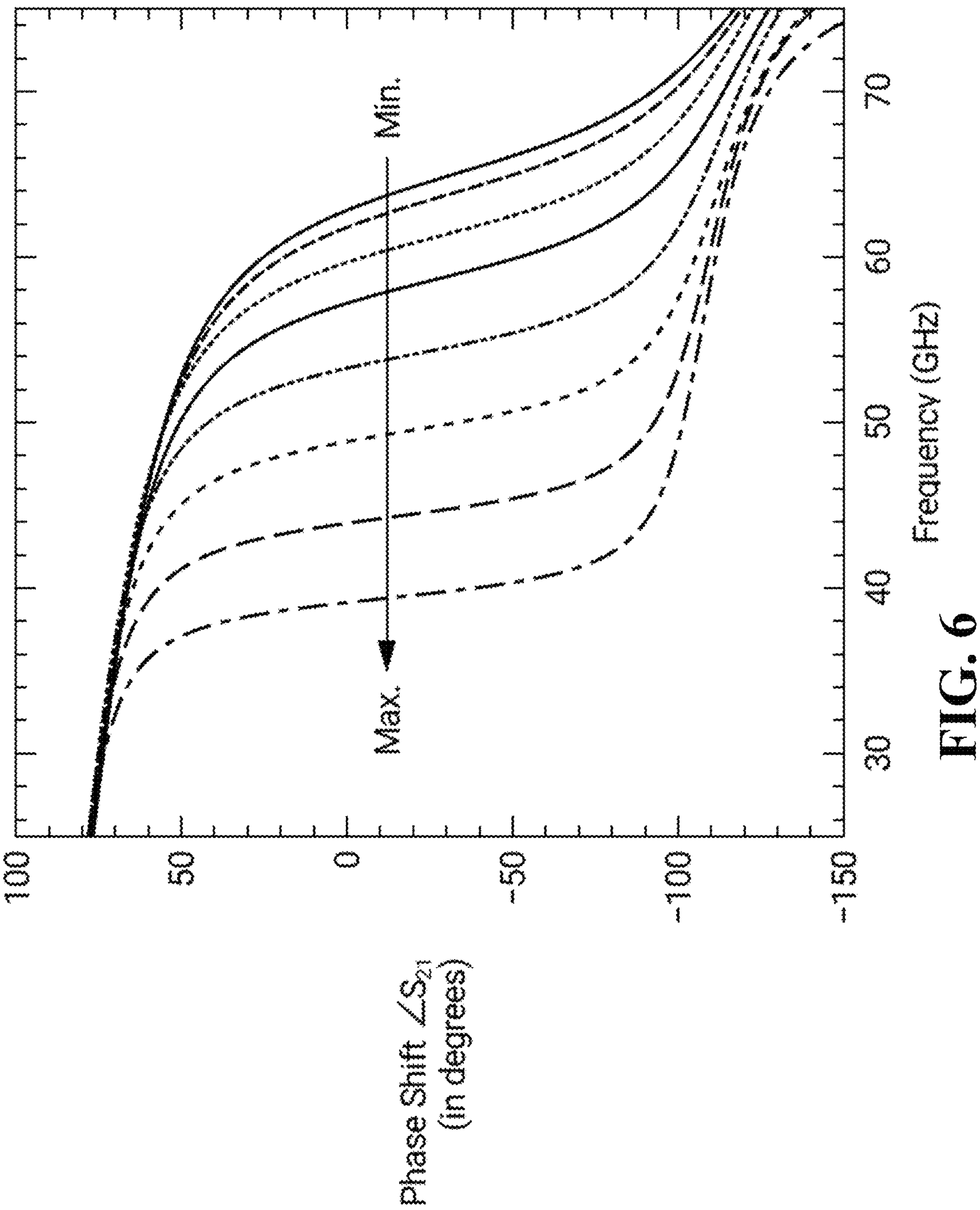
FIG. 6 is an example graphical representation showing the tunability in phase shift of a reflected signal resulting from a controlled change in width of a phase change material lower resistance patch demonstrating a 27 GHz bandwidth in the U-Band that also covers sixty percent of the V-Band, in accordance with various aspects and implementations of the subject disclosure.
Figure 7:
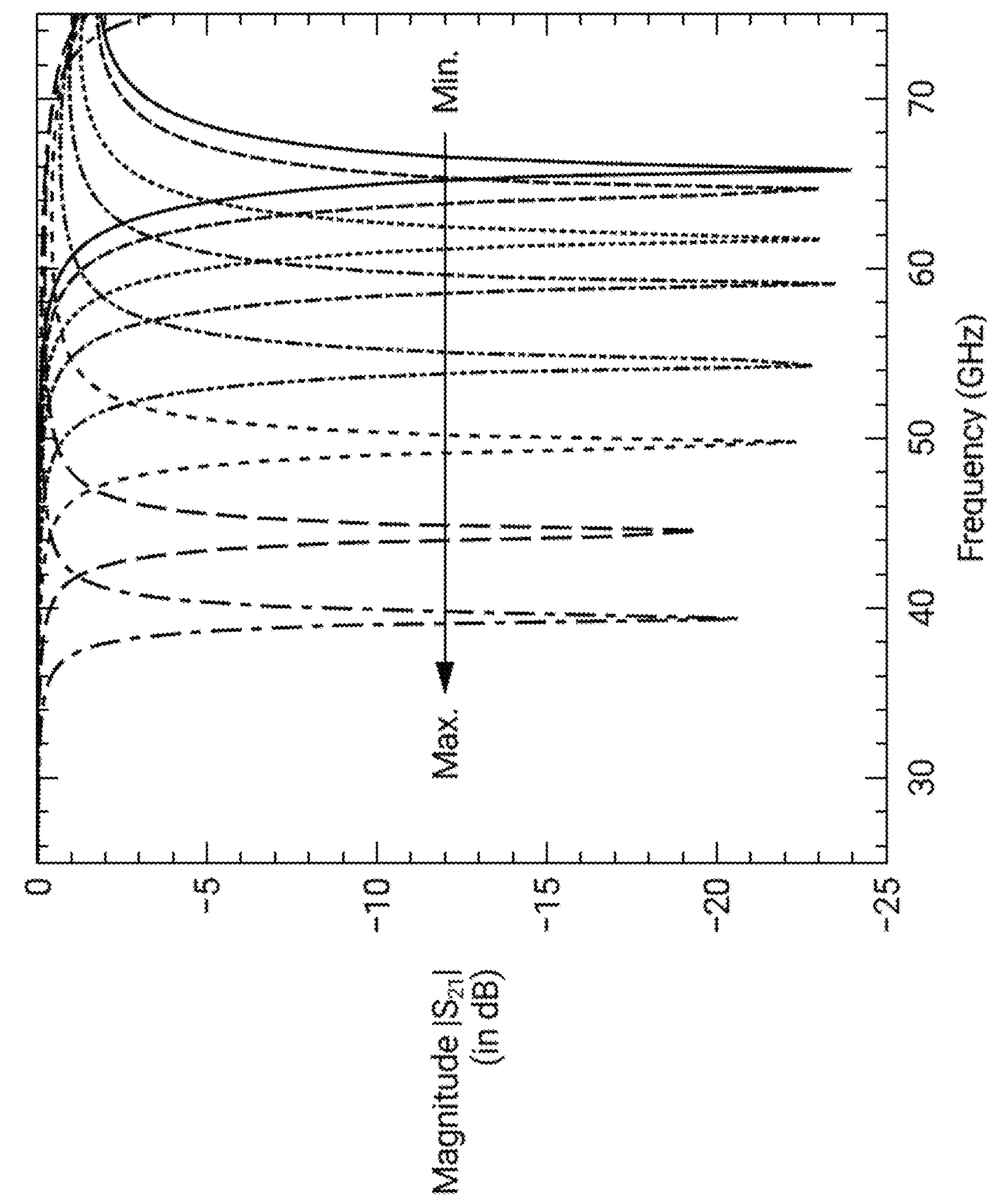
FIG. 7 is an example graphical representation showing the magnitude change of $|S_{21}|$ highlighting the tunability in resonance frequency within the U-Band and sixty percent of the V-Band U-band (40-60 GHZ) with a 27 GHz bandwidth.

The device performance can be simulated using full-wave 3D electromagnetic (EM) simulation software, and the phase shift offered to the reflected signal can be evaluated for a discrete set of widths, which can be electronically controlled. One example unit-cell was designed for operation around 50 GHZ, with an extremely large 27 GHz bandwidth. The relative phase shift offered to the reflected signal from the unit-cell is graphically represented in FIG. 6, with various widths of the conductive patch ranging from a minimum area to a maximum area with respect to the reduction/expansion of the conductive area. In one embodiment, each heater element can actuate an area of 0.1 mm; hence the simulations were performed with a step size of 0.1 mm in width. The phase shift offered to the reflected electromagnetic signal from the unit cell can be tuned by changing the width of the conductive patch as displayed in the simulated performance in FIG. 6. The corresponding shift in the resonance in magnitude of $|S_{21}|$ is represented in FIG. 7, demonstrating 27 GHz bandwidth over the U-Band and spanning towards the V-Band.

Figure 8:
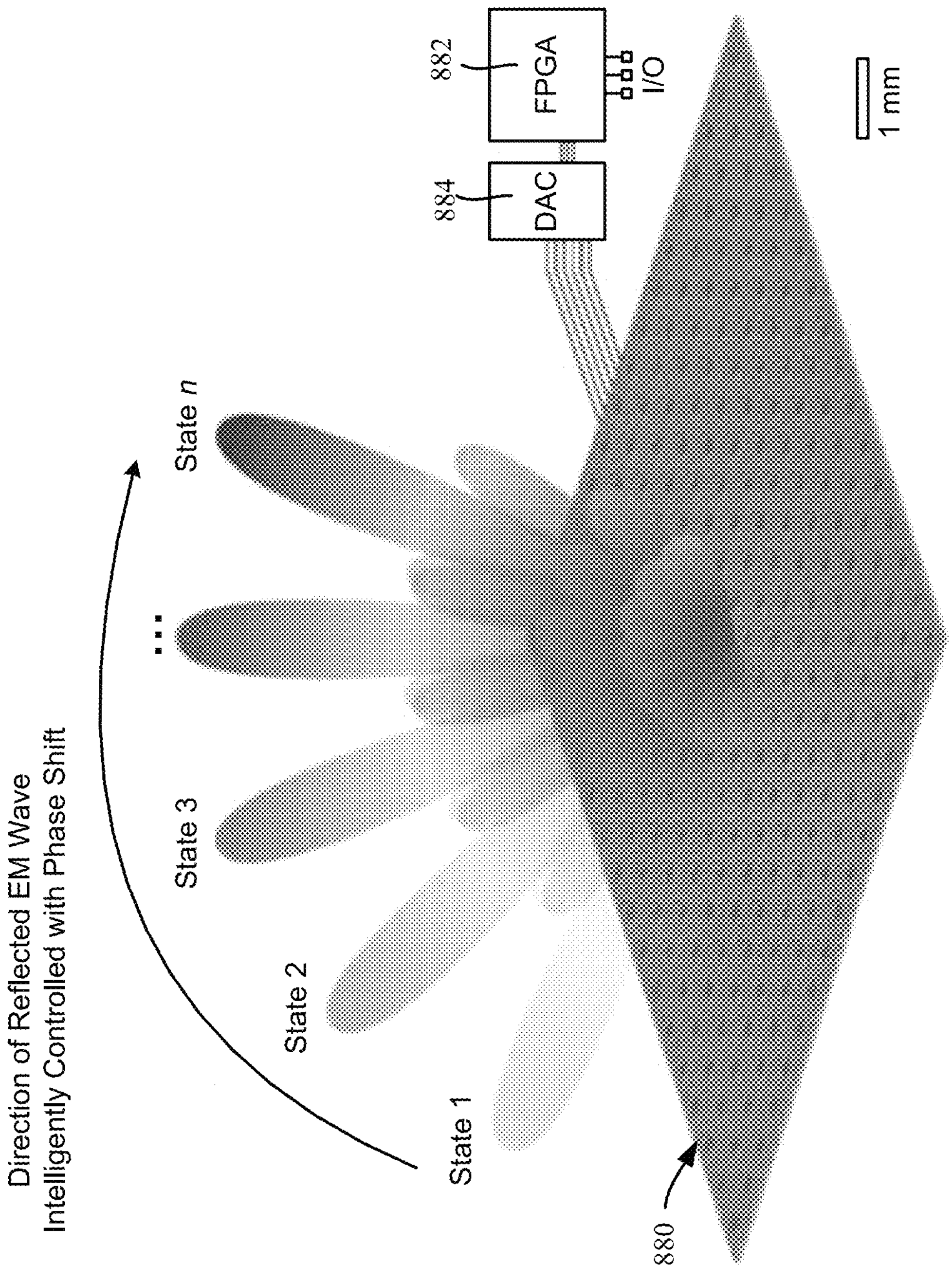
FIG. 8 is a representation of an example overall reconfigurable intelligent surface system showing the direction of a reflected beam being controlled by a configuration provided by a field programmable gate array, in accordance with various aspects and implementations of the subject disclosure.

A reconfigurable intelligent surface can be formed by arranging multiple unit cells in a two-dimensional m×n array, e.g., as shown in the surface 880 of FIG. 8. In general, a reconfigurable intelligent surface is a planar surface built from an array of passive reflecting (or refracting) elements, each of which can independently impose the required phase shift on the incoming signal. By adjusting the phase shifts of the reflecting elements, reflected signals can be reconfigured to propagate towards their desired directions. As described herein, the reflection coefficients of each element can be reconfigured in real-time to adapt to the dynamically fluctuating wireless propagation environment. By appropriately tuning the phase shifts of the reflecting elements of the reconfigurable intelligent surface, the reflected signals can be constructively superimposed with those from the direct paths for enhancing the desired signal power, or destructively combined for mitigating deleterious effects of multiuser interference. Hence, reconfigurable intelligent surfaces provide additional degrees of freedom to further improve the system performance. In the outdoors, a reconfigurable intelligent surface can be applied to buildings, windows and so forth to enhance the signal in dead or weak zones and strengthen the signal in already covered areas. A reconfigurable intelligent surface can also be deployed for spatial microwave modulation in a typical office room and can passively increase the received signal power by an order of magnitude, or completely null it. Furthermore, a reconfigurable intelligent surface naturally operates in full-duplex (FD) mode without self-interference or introducing thermal noise. Therefore, reconfigurable intelligent surfaces achieve higher spectral efficiency than active half-duplex (HD) relays, despite their lower signal processing complexity relative to that of active full duplex relays requiring sophisticated self-interference cancellation.

Thus, as shown in FIG. 8, a reconfigurable intelligent surface 880 formed from an array of unit cells is able to vary the direction of a reflected beam/electromagnetic wave based on intelligently controlling the phase shifts of the unit cells, in this example via a field-programmable gate array. With respect to configuring the array digitally, in this example a field-programmable gate array (e.g., controller) 882 is used to provide the output, mapped to the heating elements of the cells and converted (DAC 884) to the appropriate RESET or SET pulses based on the zero- or one-bit pattern instruction as needed, to each heating element of each cell of the array of cells as needed to change state. The output gives instructions to the individual heating/switching elements of the individual unit cells, independent from each other switching element, and thereby sets the cell's phase shift independent from each other cell. In other words, actively tuning the phase change material-in each cell can be individually controlled by the field-programmable gate array 882, which provides a coding output of 0s and 1s.

Figure 9A:
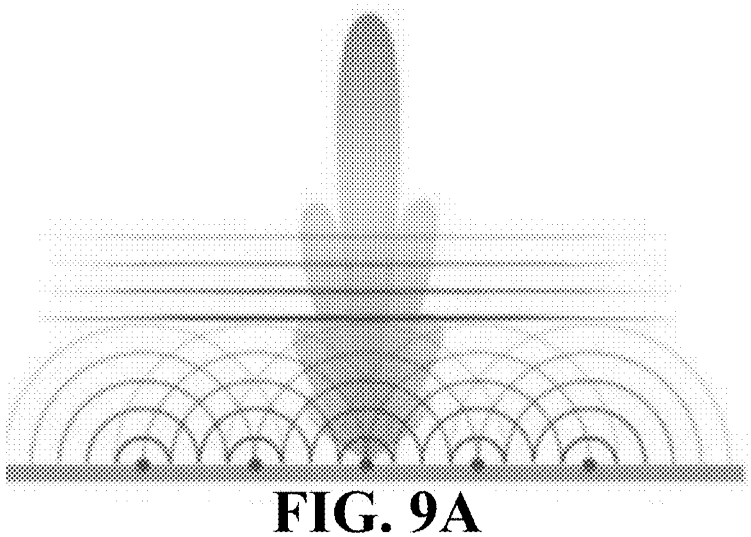
FIGS. 9A-9C are representations of phase shifts from unit cells configured such that a constructive interference of the reflected signals from each unit cell is achieved in a desired target direction, in accordance with various aspects and implementations of the subject disclosure.
Figure 9B:
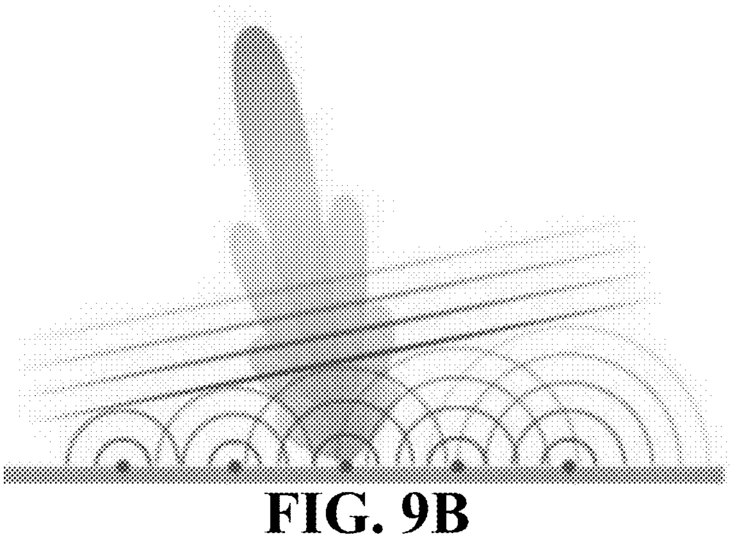
Figure 9C:
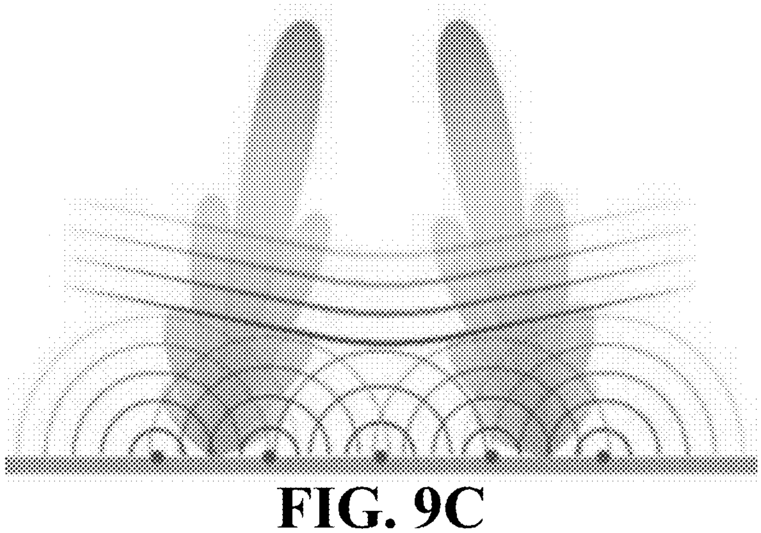

FIGS. 9A-9C show how the phase shifts from the unit cells are configured such that a constructive interference of the reflected signals from each unit cell is achieved in the desired target direction. Destructive interference to a desired direction can also be leveraged.

Unlike other reconfigurable intelligent surfaces (in which each unit cell typically can only provide either a phase response of 0° or 180°; the coding for such a 1-bit digital cell state will be either "0" or "1" for OFF and ON switching, respectively), the analog-like reconfigurable intelligent surface described herein can use higher bit coding to describe the phase responses from individual unit cells. Depending on the beam steering precision desired by a given application, a system can select the number of phase states needed. For example, a 1-bit system with a single heating element can provide two possible phase states (chalcogenide switches can be used), while as described above, a system with more bits corresponding to more heating elements can provide more possible widths (e.g., the tunable chalcogenide unit cell as described herein) from each cell.

The technology described herein can function with a minimal power supply, as the electrical pulse is needed only during a change of configuration, a significant advantage over technologies that need continuous power to hold one of the states. Another significant and beneficial feature of this design is that the unit cells described herein can receive and transmit electromagnetic waves simultaneously, hence achieving full-duplex operation.

The technology described herein is suitable for reconfigurable intelligent surface-assisted wireless communications. Because the direct path between the access point and a target of interest can be fully/partially obstructed by other objects, the use of a reconfigurable intelligent surface can substantially improve the wireless network performance, particularly in crowded indoor/outdoor scenarios.

For example, with respect to an outdoor scenario, by installing the reconfigurable intelligent surface on common surfaces such as building walls, windows, billboards, traffic signs and the like, and because as described herein the direction of the reflected and/or refracted beams can be controlled, including remotely controlled, reasonably optimal reconfigurable intelligent surface deployment positions can be identified, along with the corresponding size of the reconfigurable intelligent surface needed. Reconfigurable intelligent surface placement and size can be in conjunction with the planning for a base station's position, or done afterwards by identifying the blind areas of poor signal strength in the network coverage map. This can not only improve the signal reception in the shadow areas, but also improve the data rates in the areas with an already good signal reception. Thus, a reconfigurable intelligent surface can be used for solving the network coverage problem of 5G/6G and even beyond, without adding much power/cost overhead.

Consider by way of example a typical scenario of an outdoor urban area with a single base station. For low frequency radio transmissions, the signal can propagate to long and far distances without significant attenuation due to its long wavelength. But high frequency signals suffer serious attenuation and blockage from objects, whereby the wireless coverage from a single base station will be weak, or even provide no coverage in certain zones. Depending on the location of the base station and the positions of the users, the (mostly) optimal location and size for reconfigurable intelligent surface on billboards, highway signs, walls, windows, and corners of the buildings can be selected.

The signals from the base station reflect off of (or can be refracted by) the passive reconfigurable intelligent surface, can be steered in the direction of most users, and also can be steered to other reconfigurable intelligent surface in the area for further reflection/refraction. The users close to the base station generally receive a direct path signal from the base station, and (likely) also receive a reflected signal from a reconfigurable intelligent surface. The users further away from the base station (or behind obstructions) can receive the reflected or refracted signals from one or multiple reconfigurable intelligent surfaces. One or more of the reconfigurable intelligent surfaces also can employ amplification to boost signals if and when appropriate.

In an indoor scenario, windows and walls can be covered with reconfigurable intelligent surface films, which can be generally transparent, in order to extend wireless coverage indoors. By locating such films on the windows, the signals coming from the outside can be refracted and boosted inside the building, enhancing the coverage inside. The signals to an illegitimate user, e.g., an eavesdropper, can be blocked by destructive interference.

One or more implementations can be embodied in a device, including a phase change material, and a controllable energy transfer component comprising a controllable heater network that selectively transfers heat to different individual portions of the phase change material to change an operational width of the phase change material with respect to redirecting an electromagnetic wave via a phase shift that is based on the operational width. The heater network is controlled to output heat via energy pulses to selectively change a first group of one or more of the different individual portions of the phase change material to a lower resistance state, and selectively change a second group of the one or more of the different individual portions of the phase change material to a higher resistance state, wherein the first group is different from the second group.

The first group can be within a first contiguous area of the phase change material bounded by a first subgroup of the second group in a second area of the phase change material, and bounded by a second subgroup of the second group in a third area of the phase change material that can be discontiguous from the second area. The first group can be substantially centered between the first subgroup and the second subgroup.

The second group can be within a first contiguous area of the phase change material bounded by a first subgroup of the first group in a second area of the phase change material, and bounded by a second subgroup of the first group in a third area of the phase change material that can be discontiguous from the second area. The second group can be substantially centered between the first subgroup and the second subgroup.

The first group can include at least two portions in discontiguous areas of the phase change material, and the second group can include subgroups that separate the discontiguous areas.

The phase change material and the controllable energy transfer component can be part of a unit cell of a reconfigurable intelligent surface.

The device can be coupled to a controller that controls individual heating elements of the controllable heater network to selectively output heat via an energy pulse to a selected heating element of the individual heating elements at a location corresponding to one area of the phase change material.

The phase change material can include at least one of: germanium telluride or antimony telluride.

Figure 10:
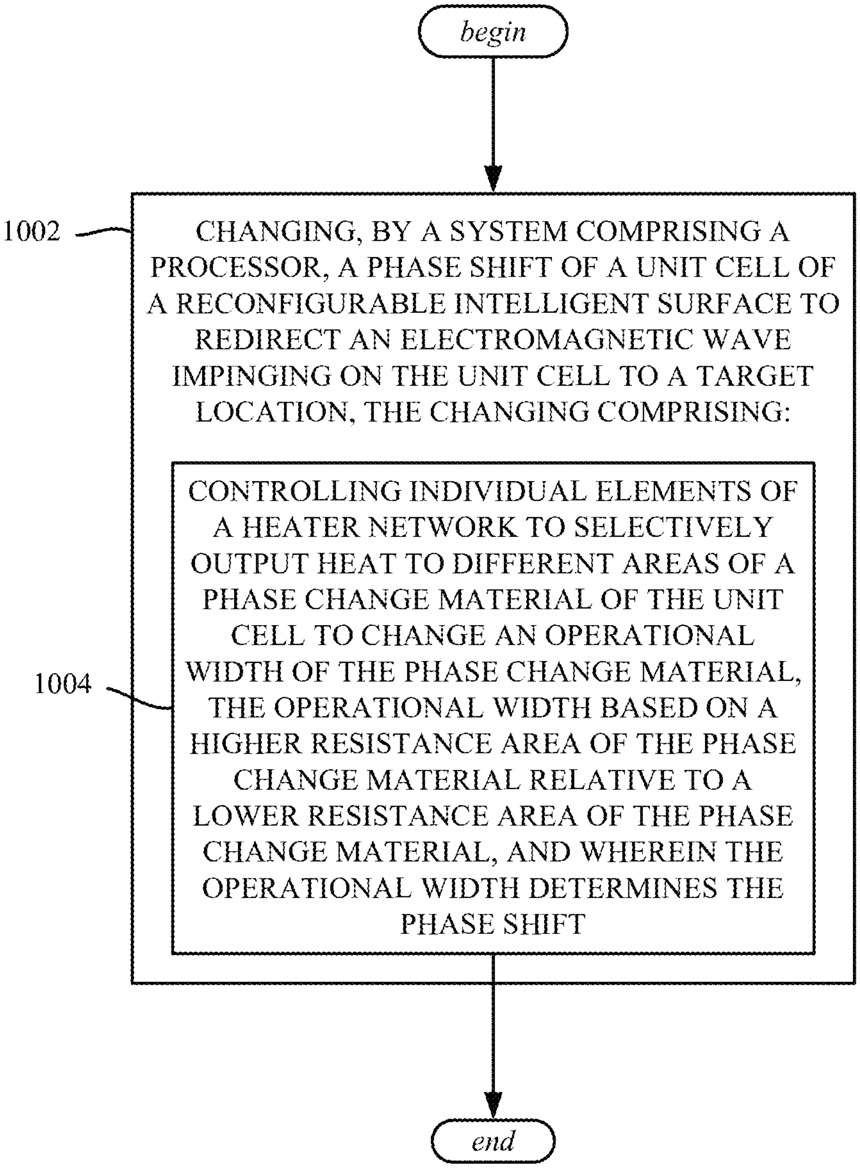
FIG. 10 is a flow diagram showing example operations related to changing phase shift of a unit cell of a reconfigurable intelligent surface by changing an operational width of the unit cell, in accordance with various aspects and implementations of the subject disclosure.

One or more example aspects, such as corresponding to example operations of a method, are represented in FIG. 10. Example operation 1002 represents changing, by a system comprising a processor, a phase shift of a unit cell of a reconfigurable intelligent surface to redirect an electromagnetic wave impinging on the unit cell to a target location, the changing including example operation 1004. Example operation 1004 represents controlling individual elements of a heater network to selectively output heat to different areas of a phase change material of the unit cell to change an operational width of the phase change material, the operational width based on a higher resistance area of the phase change material relative to a lower resistance area of the phase change material, and wherein the operational width determines the phase shift.

The phase shift can be a first phase shift, the target location can be a first target location, and further operations can include obtaining, by the system, information representative of a second target location, and, in response to the obtaining of the information, redirecting, by the system, the electromagnetic wave to the second location, which can include controlling the elements of the heater network to increase the low resistance area to enlarge the width of a conductive patch within the phase change material, the width of the conductive patch corresponding to a second phase shift.

The phase shift can be a first phase shift, the target location can be a first target location, and further operations can include obtaining, by the system, information representative of a second target location, and, in response to the obtaining of the information, redirecting, by the system, the electromagnetic wave to the second location, which can include controlling the elements of the heater network to decrease the low resistance area to reduce the width of a conductive patch within the phase change material, the width of the conductive patch corresponding to a second phase shift.

Controlling of the individual elements of the heater network to selectively output the heat can include pulsing a selected element with a voltage or current pulse to set a portion of the higher resistance area to a lower resistance portion, the lower resistance portion corresponding to a location of the selected element.

One or more implementations can be embodied in a unit cell, comprising a phase change material distributed over an area that corresponds to a surface of the unit cell, and a heater network including individually controllable heating elements distributed over the area to transfer heat to different portions of the phase change material. The individually controllable heating elements can be controlled to output heat corresponding to energy pulses to the different portions to change an operational width of the phase change material that is based on a higher resistance width corresponding to a higher resistance state of the phase change material, and a lower resistance width corresponding to a lower resistance state of the phase change material, in which the operational width determines a phase shift of the unit cell that redirects an electromagnetic wave impinging on the unit cell to a target location.

The unit cell can be a first unit cell of a reconfigurable intelligent surface including the first unit cell and a second unit cell, and the individually controllable heating elements of the first unit cell can be controlled to change the operational width of the phase change material to create constructive interference with the electromagnetic wave as redirected from the second unit cell.

The unit cell can be a first unit cell of a reconfigurable intelligent surface comprising the first unit cell and a second unit cell, and the individually controllable heating elements of the first unit cell can be controlled to change the operational width of the phase change material to create destructive interference with the electromagnetic wave as redirected from the second unit cell.

The unit cell can include a thermally conductive layer between the phase change material and the heater network.

The unit cell can include a thermal insulator layer and a dielectric layer, and wherein the thermal insulator layer is positioned between the heater network and a dielectric layer of the unit cell.

The phase change material in the lower resistance state and the dielectric layer can form a capacitor having a capacitance value determined by the operational width of the phase change material in the lower resistance state.

The electromagnetic wave can be between forty gigahertz and seventy-five gigahertz, inclusive.

As can be seen, there is described herein tunable devices with respect to their phase shifts, including for unit cells, and a highly reconfigurable intelligent surface design, in which programming the actuation voltage to the chalcogenide elements realizes different effective operational widths, which leads to changes in the phases of a reflected electromagnetic wave. Analog-like fine tuning can be achieved by controlling the actuation states per heating element, whereby the phase precision comes without increasing the complexity of the design. The reconfigurable intelligent surface described herein can operate at high frequencies such as U-Band and at least some V-Band frequencies. Chalcogenide-based radio frequency switches and tuning elements demonstrate suitable performance at such frequencies.

Moreover, the compact size of the chalcogenide element makes it highly suitable for monolithic integration with a wide range of technologies. Each chalcogenide switch can be implemented with a compact footprint in sub-micron sizes, including for shrinking reconfigurable intelligent surface cell size at higher frequencies, in which chalcogenide capacitive elements/switches fit more than adequately and can be monolithically integrated within each unit cell.

Still further, the reconfigurable intelligent surface offers low ON-state insertion loss; because some of the chalcogenide materials including germanium telluride has very low crystalline state (ON state) resistance of less than one Ohm, and low OFF-state capacitance of 7 fF (femto-farad), the figure of merit of the switches is 0.04 ps (picoseconds), which is far higher than any known commercially available PIN diodes or semiconductor RF switches.

The reconfigurable intelligent surface design and tunable capacitive element technology described herein needs power only during a state transition, thus saving significant power when in a steady state. Indeed, the chalcogenide material (especially germanium telluride) only needs an electrical pulse when transitioning from one state to another, as the material subsequently latches into a state. Hence, chalcogenide material does not need a continuous supply of power, which makes the design described herein suitable for implementing reconfigurable intelligent surfaces that can benefit from low power for operation.

What has been described above include mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:

a phase change material comprising at least one of germanium telluride or antimony telluride; and a controllable energy transfer component comprising a controllable heater network that selectively transfers heat to different individual portions of the phase change material to change an operational width of the phase change material with respect to redirecting an electromagnetic wave via a phase shift that is based on the operational width that is based on a lower resistance crystalline portion relative to a higher resistance amorphous portion, the controllable heater network controlled to output heat via electrical pulses comprising a medium amplitude and relatively longer duration SET electrical pulse used for crystallization during a transition to an ON state corresponding to a lower resistance crystallization state, and a short duration and high amplitude RESET electrical pulse used to change to a higher resistance amorphous state, wherein the electrical pulses transform the phase change material and latch the phase change material into a respective state without a need for continuous power to selectively change a first group of one or more of the different individual portions of the phase change material to the lower resistance crystallization state, and selectively change a second group of the one or more of the different individual portions of the phase change material to the higher resistance amorphous state, wherein the first group is different from the second group.

2. The device of claim 1, wherein the first group is within a first contiguous area of the phase change material bounded by a first subgroup of the second group in a second area of the phase change material, and bounded by a second subgroup of the second group in a third area of the phase change material that is discontiguous from the second area.

3. The device of claim 2, wherein the first group is substantially centered between the first subgroup and the second subgroup.

4. The device of claim 1, wherein the second group is within a first contiguous area of the phase change material bounded by a first subgroup of the first group in a second area of the phase change material, and bounded by a second subgroup of the first group in a third area of the phase change material that is discontiguous from the second area.

5. The device of claim 4, wherein the second group is substantially centered between the first subgroup and the second subgroup.

6. The device of claim 1, wherein the first group comprises at least two portions in discontiguous areas of the phase change material, and wherein the second group comprises subgroups that separate the discontiguous areas.

7. The device of claim 1, wherein the phase change material and the controllable energy transfer component are part of a unit cell of a reconfigurable intelligent surface.

8. The device of claim 1, wherein the device is coupled to a controller that controls individual heating elements of the controllable heater network to selectively output heat via an energy pulse to a selected heating element of the individual heating elements at a location corresponding to one area of the phase change material.

9. A unit cell, comprising:

a phase change material distributed over an area that corresponds to a surface of the unit cell, the phase change material comprising at least one of germanium telluride or antimony telluride; and a heater network comprising individually controllable heating elements distributed over the area to transfer heat to different portions of the phase change material, wherein the individually controllable heating elements are controlled to output heat corresponding to electrical pulses including a medium amplitude and relatively longer duration SET pulse for crystallization to an ON state corresponding to a lower resistance crystalline state, and a short duration and high amplitude RESET pulse to change to a higher resistance amorphous state, wherein the pulse transforms the phase change material and latches the phase change material into a respective state without a need for continuous power to the different portions to change an operational width of the phase change material that is based on a higher resistance width corresponding to the higher resistance amorphous state of the phase change material, and a lower resistance width corresponding to the lower resistance crystalline state of the phase change material, wherein the operational width determines a phase shift of the unit cell that redirects an electromagnetic wave impinging on the unit cell to a target location.

10. The unit cell of claim 9, wherein the unit cell is a first unit cell of a reconfigurable intelligent surface comprising the first unit cell and a second unit cell, and wherein the individually controllable heating elements of the first unit cell are controlled to change the operational width of the phase change material to create constructive interference with the electromagnetic wave as redirected from the second unit cell.

11. The unit cell of claim 9, wherein the unit cell is a first unit cell of a reconfigurable intelligent surface comprising the first unit cell and a second unit cell, and wherein the individually controllable heating elements of the first unit cell are controlled to change the operational width of the phase change material to create destructive interference with the electromagnetic wave as redirected from the second unit cell.

12. The unit cell of claim 9, wherein the unit cell comprises a thermally conductive layer between the phase change material and the heater network.

13. The unit cell of claim 9, wherein the unit cell comprises a thermal insulator layer and a dielectric layer, and wherein the thermal insulator layer is positioned between the heater network and the dielectric layer of the unit cell.

14. The unit cell of claim 13, wherein the phase change material in the lower resistance crystalline state and the dielectric layer form a capacitor having a capacitance value determined by the operational width of the phase change material in the lower resistance crystalline state.

15. The unit cell of claim 9, wherein the electromagnetic wave is between forty gigahertz and seventy-five gigahertz, inclusive.

16. A device, comprising:

a reconfigurable intelligent surface a group of unit cells, where each unit cell comprises:

a phase change material distributed over an area that corresponds to a surface of the unit cell, the phase change material comprising at least one of germanium telluride or antimony telluride; and a heater network comprising individually controllable heating elements distributed over the area to transfer heat to different portions of the phase change material, wherein the individually controllable heating elements are controlled to output heat corresponding to electrical pulses including a medium amplitude and relatively longer duration SET pulse for crystallization to an ON state corresponding to a lower resistance crystalline state, and a short duration and high amplitude RESET pulse to change to a higher resistance amorphous state, wherein the pulse transforms the phase change material and latches the phase change material into a respective state, without continuously providing power to the different portions, to change an operational width of the phase change material that is based on a higher resistance width corresponding to the higher resistance amorphous state of the phase change material, and a lower resistance width corresponding to the lower resistance crystalline state of the phase change material, wherein the operational width determines a phase shift of the unit cell that redirects an electromagnetic wave impinging on the unit cell to a target location.

17. The device of claim 16, wherein the individually controllable heating elements of the unit cell are controlled to change the operational width of the phase change material of the unit cell to create constructive interference with an electromagnetic wave as redirected from another unit cell of the group of unit cells.

18. The device of claim 16, wherein the individually controllable heating elements of the unit cell are controlled to change the operational width of the phase change material of the unit cell to create destructive interference with an electromagnetic wave as redirected from another unit cell of the group of unit cells.

19. The device of claim 16, wherein the unit cell comprises a thermally conductive layer between the phase change material and the heater network.

20. The device of claim 16, wherein the unit cell comprises a thermal insulator layer and a dielectric layer, and wherein the thermal insulator layer is positioned between the heater network and the dielectric layer of the unit cell.

* * * * *